May 21, 1968 KARL ÅKE LAGERQVIST 3,384,899

MAGNETIC TAPE RECORDING UTILIZING A MAGNETIC CODE WHEEL

Filed Dec. 22, 1964 3 Sheets-Sheet 1

INVENTOR.
Karl Åke Lagerqvist
BY Green Maréchal ...

MAGNETIC TAPE RECORDING UTILIZING A MAGNETIC CODE WHEEL

INVENTOR.
Karl Åke Lagerqvist
BY [signature]

INVENTOR.
Karl Åke Lagerqvist
BY
Greer Maréchal Jr

United States Patent Office 3,384,899
Patented May 21, 1968

3,384,899

MAGNETIC TAPE RECORDING UTILIZING A MAGNETIC CODE WHEEL

Karl Åke Lagerqvist, Bandhagen, Sweden, assignor to Hugin Kassaregister Aktiebolag, a corporation of Sweden Filed Dec. 22, 1964, Ser. No. 420,348
12 Claims. (346—74)

ABSTRACT OF THE DISCLOSURE

Apparatus is provided for use with such devices as cash registers and accounting machines which provides for the registration of the transactions of the devices on magnetic tape and which includes a soft magnetic circuit with two gaps, a permanent magnet movable from an open position opening one of said gaps to a closed position closing the gap, and with the second gap having one side defined by a counter-pole and the opposite side defined by a soft magnetic support adjustable with respect to the counter-pole and forming part of the soft magnetic circuit, the support having a plurality of different character-shaped soft poles on the surface thereof, and a magnetizable tape disposed and movable in the second gap for the marking thereon of a selected one of the soft character-shaped poles in response to the movement of the permanent magnet to closed position.

This invention relates to a process and a device for the registration of coded markings on a magnetisable support.

It is often required to register or otherways to treat transactions made in different places in a central device. The transactions are often registered, e.g. in a cash register or accounting machine, by which they are registered on control strips, lists or blankets. For the central treating of the transactions for their totalising, accumulation and/or statistic analysis, these registrations are forwarded to a central place, where they are read and transferred by means of code markings on perforated strips or magnetic tape, which can be fed into data processing machines, which can be of a known type. This invention concerns a process, by which the transactions can be noted or registered in a simple, practical and very useful manner in the form of coded markings on a support, which can be used directly in a data processing machine, whereby the sources of errors necessarily connected with the reading and codifying of the registration can be avoided. By data processing machine it is intended to cover as well simpler, more or less automatic, collecting bookkeeping units, which receive their information from several places of transaction within a district, as larger, more central data processing and memorising units for a number or group of districts.

The registration of transactions in the form of code markings punched into strips are connected with the disadvantage, that the code markings must be relatively large to be sufficiently clear and unequivocal and must be punched in relatively thick strips of solid material so that they are not easily damaged when handled and thereby become unreadable and incorrect. The strips cannot be used more than once and are therefore subject to large consumption. For these reasons the costs for the strips become very high. A relatively high power is necessary for the punching of the code markings. The registering apparatus therefore becomes bulky and heavy and cause high costs in manufacture and use. Their handling is intricate and they are not appropriate for mounting in ordinary, especialy hand driven cash registers.

The registration in the form of magnetic code markings on magnetisable supports necessitates normally a source of electric current and sensible rectificator and pulse sending means, which make the apparatus unwieldly and relatively bulky. In this case, however, the magnetisable support can be made very thin with a small surface, since it is not subject to severe mechanical stresses and code markings, even such of rather intricate character, can be made with very small spaces and can be given very small dimensions while still maintaining a good and secure sensing by the electric sensing means in a central data processing plant.

It has been suggested to register markings on a magnetisable support by means of permanent magnetic code marking pieces, which are displaceable onto and away from the magnetisable support for these markings. Since the code marking pieces effect a movement relative to registration support the latter is subject to a magnetic field of variable strength and concentration. The markings become coarse and indistinct and this method can therefore not be used for producing clearly defined code markings within very small dimension limits. It has further been suggested to produce magnetic markings by means of two soft magnetic poles having between them a small gap and both placed near one side of a magnetisable support and to induce a magnetic flow through the poles by means of a permanent magnet movable between the two poles. Even this system can only produce coarse and undifferentiated markings, which if they should be combined into differentiated code markings, would take much space on the magnetisable support.

The present invention has made it possible to produce with simple means and at high speed very small, distinct magnetized markings corresponding to defined, selectable code marks by adjusting a number of poles having pole surfaces corresponding to different code markings with a selected pole surface opposite a counter pole in a soft magnetic circuit containing the poles and the counter pole and by adjusting a magnetisable support between the selected pole surface and the counter pole, whereafter a magnetic flux is for a short time period closed through the soft magnetic circuit by means of a permanent magnet.

The invention also concerns an apparatus for performing the above process comprising an open soft magnetic circuit with two gaps and a permanent magnet, which is displaceable into and away from a position closing one of said gaps in the soft magnetic circuit.

Further details and different embodiments of the invention are described in the following with reference to the accompanying drawings.

Figure 1:
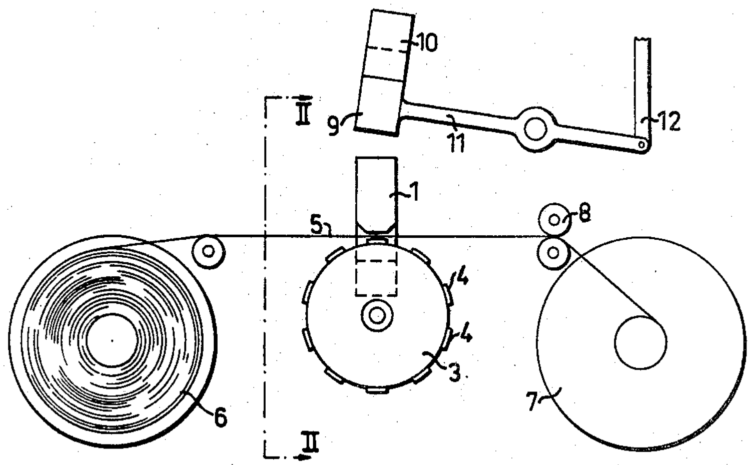
FIG. 1 is a diagrammatical side elevation of a registering apparatus according to one embodiment of the invention.
Figure 2:
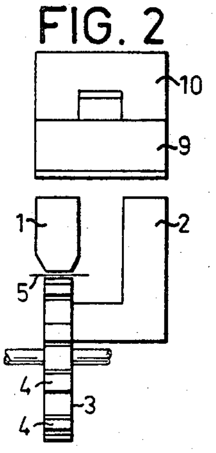
FIG. 2 is an end view of the same apparatus seen from the line II—II in FIG. 1.

Referring to FIGS. 1 and 2 there is a soft magnetic circuit having openings in its upper and lower parts and comprising two soft iron parts 1 and 2. The lower opening in the magnetic circuit is with the exception of very small gaps necessary to allow relative movement of adjacent parts closed by a wheel 3, equally of soft iron, in the periphery of which are inserted pole pieces 4, projecting from the periphery of the wheel 3 and having on their outer surfaces projections corresponding to desired code marks. One of the soft iron parts 2 of the circuit adjoins the plane side surface of the wheel and the other soft iron part 1 of the circuit has an end surface facing the periphery of the wheel shaped into a counter pole, the pole surface of which facing the code mark pole surface selected by rotational adjustment of the wheel 3. Between the pole piece 4 and the counter pole there is a gap just sufficient to permit the adjustment therein of a magnetisable tape 5. This tape is fed from a store reel 6 to a take up reel 7 in steps adapted to the requirements of the registration by means of appropriate feed means, e.g. a feed roller 8. These feed means for the tape are of course much simplified and any appropriate known means permitting a very rapid feeding in steps might be used. The upper ends of the soft iron parts 1 and 2 are in the same plane and form the upper opening of the magnetic circuit. Above these parts there is a permanent magnet bar 9, which is movable in transverse direction toward and against the upper surfaces of the soft iron parts 1 and 2 and away from them. In the rest position illustrated in FIGS. 1 and 2 of the permanent magnet bar 9 this rests against a yoke of soft iron 10 serving to short-circuit the field of the magnet so as to prevent it from magnetically influencing the soft iron circuit 1, 2, 3. This makes it also possible to maintain a shorter distance between the rest position of the magnet bar 9 and the soft iron parts 1 and 2, which in its turn permits smaller and more rapid movements of the magnet bar 9.

In FIG. 1 the permanent magnet bar 9 is shown as mounted on a lever 11, connected by means of transmission means 12 in known manner to a drive mechanism, not shown. Sheets or layers of non magnetic material can in known manner be applied to the cooperating surfaces of the magnet bar and/or of the soft iron parts 1 and 2 and also of the short-circuiting yoke 10, so as to limit the magnetic flux, which facilitates the separation of the magnet bar from the cooperating surfaces in the circuit and the bracket.

Such a device is preferably combined with a machine containing a computer or register so that the wheel 3 is rotated simultaneously with a digital wheel in a totaliser or other counting mechanism in the machine. After the wheel 3 has been adjusted according to the adjustment of the digital wheel, the drive mechanism of the machine operates the lever 11 and moves the permanent magnet bar 9 towards the soft iron parts 1 and 2 and then back again towards the short-circuit yoke 10. Thereby a magnetic flux is for a short time closed through the parts 1 and 2, the wheel 3, the pole piece 4 turned downwards and facing the counter pole 1 and the magnetizable tape 5, whereby a code mark of a shape corresponding to the shape of the pole surface of the pole piece is registered on the tape. Thereafter the tape 5 can be fed one step corresponding to the width of the code mark plus the space between the markings so as to be ready to receive a further registration by operating the magnet bar 9 after the code mark pole supporting wheel 3 has been rotated to adjust another pole piece in registering position. The parts can be made very small, since the code marks can be kept very small because of the high dissolving properties of available magnetisable tapes. The moving parts are few and small, so that the device can work very rapidly and with high accuracy. It is thus possible in a device provided for the registration of figures set successively on a cash register to register these figures simultaneously as they are set so that e.g. markings corresponding to the different digits of a number are registered on the tape successively along the tape.

Figure 3:
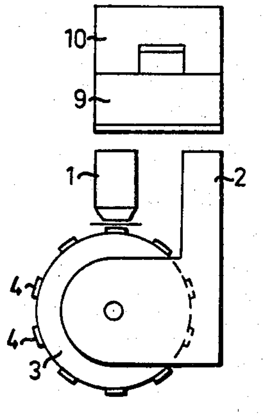
FIGS. 3 and 4 are two projections at right angles of a second embodiment of the registering apparatus comprising a wheel forming a support for a number of different code mark poles.
Figure 4:
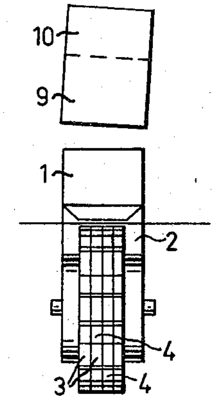

It will, however, be preferable, especially in connection with high speed computing and bookkeeping machines, to arrange several pole supporting wheels 3 side by side like the digit wheels in an ordinary register, e.g. as shown in FIGS. 3 and 4. The code pole supporting wheels 3 can be adjusted simultaneously and individually in known manner either by means of co-axial, individual shafts or by means of gear wheels or other transfer means cooperating with peripheral parts of the wheels besides the pole pieces. In this case the magnetisable tape 5 runs parallel with the axis of the wheels 3. With this device it is possible to register simultaneously several code marks on the tape. If by combination of the two embodiments described above, several code mark pole wheels 3 are mounted side by side for simultaneous registration on a broader tape running tangentially of the wheels, several code markings can be registered in transversal rows on the tape, which permits to register a larger number of markings on a given length of tape.

Figure 5:
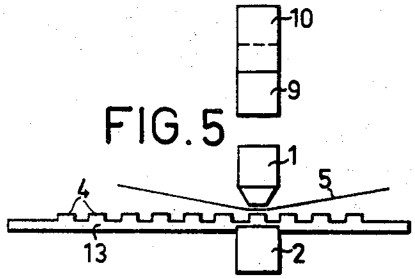
FIGS. 5 and 6 are two projections at right angles of an embodiment with a support for the code mark poles in the form of a displaceable bar similar to a printing type bar.
Figure 6:
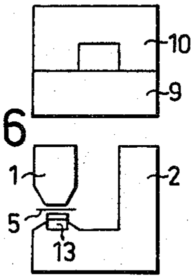

Instead of using code pole piece supporting wheels 3 according to FIGS. 1 to 4. it is also possible to use code pole supporting bars 13, as shown in FIGS. 5 and 6. These bars work mainly in the same manner as printing type bars or actuator bars in known types of calculating machines. Even based on this principle it is possible to combine several code pole supporting bars for simultaneous registration of several code markings.

In the embodiments above described the parts are disposed so that the pole pieces for their selection and the magnetisable tape for its feeding are moved in directions which are either parallel or form right angles with each other, the magnetic circuit being disposed in a plane forming right angles with these directions. It is, however, also possible to dispose the direction of motion of the code pole pieces and of the magnetisable tape and the plane of the magnetic circuit in other relative angular positions, e.g. with angles of 60° between them or to place the plane of the magnetic circuit in a plane situated between the moving directions of the tape and the poles. This can under certain conditions give a greater latitude in the selection of the relation between the width of the tape and the number of code markings which can be registered per unit of length or width of the tape. A larger number of code markings per unit of length of the tape can be registered on a relatively small tape if the rows of code markings are inclined in relation to the longitudinal direction of the tape.

Figures 7, 8, 12, 13, 14:
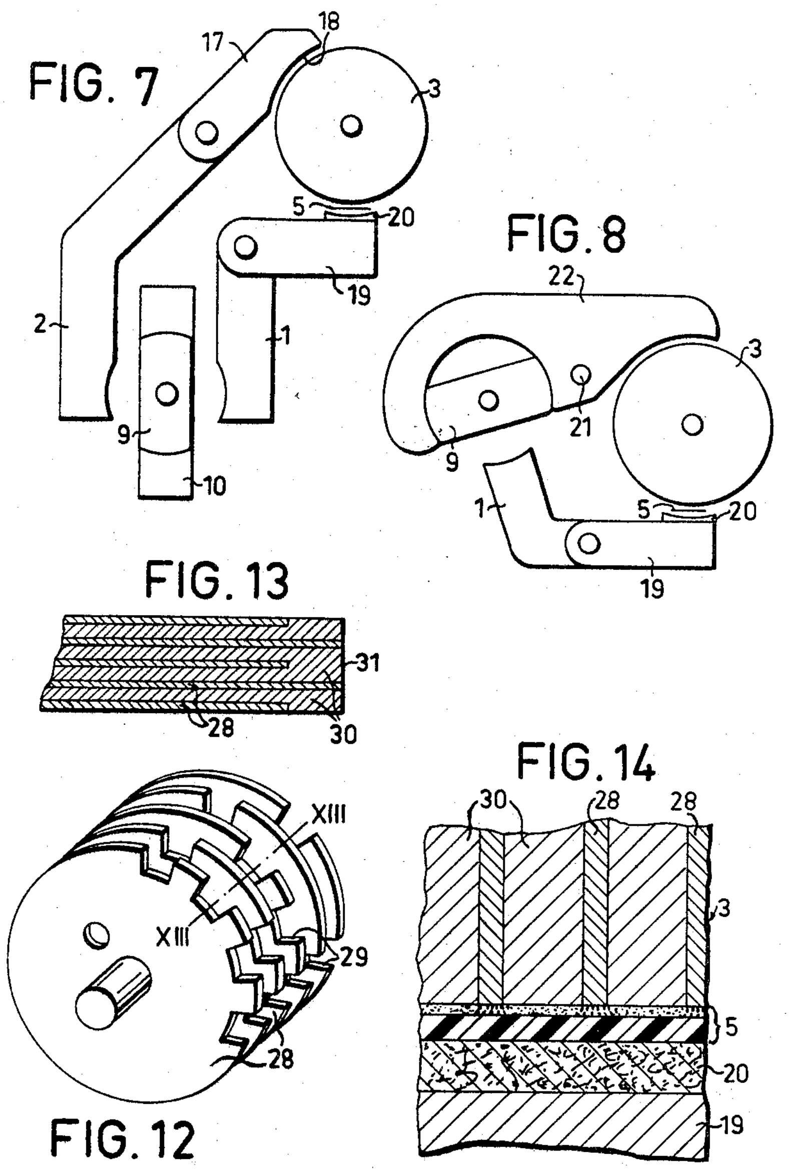
FIG. 7 shows an embodiment with an oscillating permanent magnet and with parts of the soft magnetic circuit adapted to be closed onto a code mark poles supporting wheel.
FIG. 8 shows a modified embodiment of the same device.
FIG. 12 illustrates the construction of a code mark pole support according to another embodiment.
FIG. 13 is a partial view of a section taken along line XIII—XIII in FIG. 12.
FIG. 14 is a portion at a highly enlarged scale of a radial section through a code mark support wheel according to FIGS. 12 and 13 and the adjoining parts of a magnetisable tape and a counter pole in the position for magnetisation.

The permanent magnet bar may, instead of being displaceable transversely towards the endst of the soft iron parts 1 and 2 even be mounted for rotation, as shown in FIG. 7 according to which the magnet bar 9, in its rest position, is positioned between the ends of a short-circuiting yoke 10. The magnet bar 9 by being turned a quarter of a revolution about an axle 16, is brought to close a magnetic flux through the soft iron parts 1 and 2. Instead of connecting the wheels supporting the code pole pieces to the soft iron part by their side faces, this connection can be effected through the peripheral surface of the wheels, as shown in FIG. 7, by means of connecting pieces 17 pivotally mounted on the soft iron part 2. This connecting piece has an arched connecting surface 18 adapted to fit the outer periphery of the pole piece supporting wheel. Such a wheel 3 has preferably code pole pieces which are flush with the peripheral surface of the wheel. An appropriate embodiment of such a wheel will be described further on with reference to FIGS. 12–14. If there are several pole piece supporting wheels disposed coaxially adjacent to each other, e.g. as shown in FIG. 4, there is preferably one connecting piece 17 for each wheel. These connecting pieces can be maintained in contact with the wheels 3 by individual springs permitting a secure contact while still permitting a nearly frictionless rotation of the wheels. The connecting pieces 17 can also be kept slightly spaced from the wheels while these are adjusted for the selection of a pole. The gap between the wheel and the surface 18 can be so small, that the connecting piece 17 is magnetically attracted against the wheel when closing the magnetic flux through the magnetic circuit by means of the permanent magnet bar 9. Similarly to the connecting piece 17, another connecting piece 19 can be pivotally mounted on the soft iron part 1 to press the registering tape 5 against the periphery of the wheel 3 when closing the magnetic flux. Between the connecting piece, forming the counter pole, and the tape 5, there is preferably a pad 20 serving to press the tape against the periphery of the wheel during the magnetising period.

The embodiment illustrated in FIG. 8 differs from that illustrated in FIG. 7 only by the fact, that the short-circuiting yoke 10, the soft iron part 2 and the connecting piece 17 are made in one single piece 22, which is pivotable around an axle 21.

The advantage obtained with a rotatable permanent magnet bar according to FIGS. 7 or 8 is, that the poles of the magnet bar are moved away from the adjacent pole surfaces in the direction of said surfaces, i.e. mainly transversely of the lines of force of the field, whereby a smaller effort is necessary for separating the permanent magnet bar from the soft iron parts or from the short circuiting yoke 10.

Figure 10:
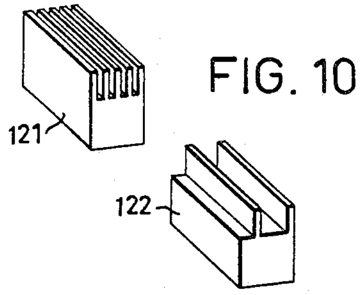
FIG. 10 shows two pole pieces with pole surfaces corresponding to code marks adapted for insertion into a code pole supporting wheel.
Figure 9:
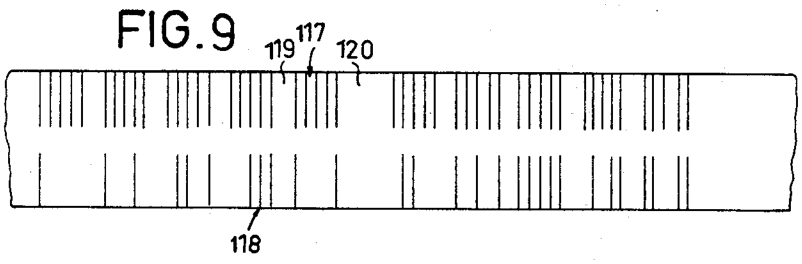
FIG. 9 shows a magnetisable tape with registered code marks at an enlarged scale.
Figure 11:
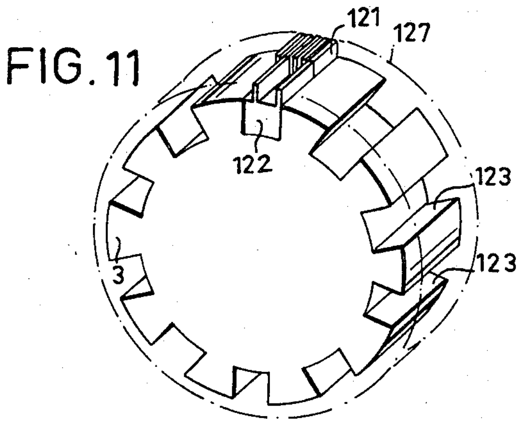
FIG. 11 shows a code mark pole supporting wheel with code mark pole pieces inserted therein.

FIG. 9 shows a preferred example of code markings. Along one edge of the tape guide or reference marking lines 117 are magnetised, which at the reading serve as references for code marking lines 118 magnetised along the other edge of the tape. The guide markings 117 are formed each of five parallel lines. The exactly opposed code markings consist of combinations of one or several such magnetised lines. Counting with a code marking consisting of no magnetised line at all, there will be 32 different combinations available. In order to give an idea of the possible dimensions of the reference and code markings it can be noted, that a normal magnetisable tape has resolving properties allowing magnetised lines of 0.1 mm. width and equally wide spaces between the lines, so that the width of a marking 117 will have a width of 0.9 mm. The spaces 119 between the markings can appropriately be 0.33 mm., so that a group of five markings receives a length of 5.7 mm. If the space 120 between the groups is made equal to the width of a marking, i.e. 0.9 mm., the pitch of the groups will be 6.6 mm. This is only mentioned as an example and to explain certain points in the following description of the pole pieces and a pole piece supporting wheel illustrated in FIGS. 10 and 11. The small tolerances for admissible deviations between the reference lines and the code mark lines depending from the small dimensions of the code markings can easily be maintained with the device illustrated in FIGS. 10 and 11. According to these small block shaped pole pieces 121 and 122 shown in FIG. 10 are inserted two and two in axial grooves in a wheel 3, shown in FIG. 11. The pole pieces can be made, e.g. in the form of continuous bars, with high accuracy concerning the outer dimensions and the spacing of the projections forming the code mark lines. By making the grooves 123 with high accuracy any desired combination of guide and code mark poles can be obtained by inserting the correct pole pieces 121 and 122 in each groove. This system can be further developed so, that one guide mark pole piece and several code mark pole pieces are inserted in each groove 123 and thereby are exactly aligned. In FIG. 11 two pole pieces are inserted in one of the grooves of a wheel. The wheel provided with the desired pole pieces can be provided with a covering of nonmagnetic material, e.g. thermoplastic material, which thereafter is ground so that the pole surfaces of the pole pieces are exactly embedded in an exactly cylindrical peripheral surface of the wheel, as indicated by line 27 in FIG. 11.

FIGS. 12 and 13 show another embodiment of code pole piece supporting wheels, which are specially adapted for a device, by which a row of code markings are to be magnetised simultaneously by a corresponding number coaxial pole supporting wheels arranged similarly to the digital wheels in a totaliser to obtain a registration of the type illustrated in FIG. 9 on a magnetisable tape running parallel with the axis of the code supporting wheels.

According to FIGS. 12 and 13 such a code pole wheel is formed of a number of thin discs 28 of soft magnetic material having recesses 29 in their edge portions, said discs being spaced from each other. The recesses correspond to the parts of the code markings where there are no code lines and the spaces between the discs correspond to the spaces between the reference or code mark lines. These discs are mounted together to form a coherent wheel by piling the discs alternatedly with spacing discs of nonmagnetic material 30, whereafter the discs and the spacings are bound together to a solid unit. The spacing discs can be made of thermoplastic material of a nonmagnetic metal which by heat and pressure can be welded together with the soft magnetic discs. The spaces left by the recesses 29 can be filled out with the material 30 either by letting the material of the spacing discs flow out into the recesses or by filling in material in the recesses after the piling together of the discs and the spacers. The periphery of the wheel is thereafter turned or ground to a smooth cylindrical surface 31 against which the magnetisable tape can be pressed without being damaged.

If the magnetisable tape is held with its magnetisable facing against the code poles and with its backing against the counter pole 1 (FIGS. 1–6) the magnetised code markings will have lines of force mainly at right angles to the tape, which makes the use of reading heads sensing the tape on opposite sides necessary for reading the registrations.

If, according to FIG. 14, however, a pad 20 of nonmagnetic material, preferably of soft elastic material as felt, is placed on the counter pole under the tape 5, the gap in the magnetic circuit is always kept larger than the thickness of the tape and thereby a certain dispersion of the magnetic field will be obtained, so that the lines of force emanating from the edges of the discs 28 will have components directed lengthwise of the tape. This makes it possible to read the registrations with ordinary reading heads having two poles placed very near each other adjacent to the layer of magnetisable material on the tape. Practical tests have shown, that very precise registrations and readings can be made at high speed in the manner above described.

Though the invention has been described and illustrated with the help of precisely defined embodiments, the invention is not limited to these. Thus the form of the soft iron parts cooperating with the permanent magnet and the type of motion and the stroke of the permanent magnet can be varied nearly indefinitely within the scope of the invention. Under certain conditions the short circuiting yoke can also be eliminated. A certain background magnetising of the tape can be allowed if the code markings sufficiently distinctly differ from the background to be able of being read correctly. The pole pieces, the corresponding code marks and the guide markings, if any, can be mounted and shaped in many different manners on pole supporting members of any kind, e.g. both such members similar to known counting members in computing machines, viz, wheels, bars, sectors and others. Such pole supporting members may also be made movable in two directions to select any single one of a larger number of code pole surfaces disposed in several rows on the supporting member, e.g. plates, cylinders or the like, in magnetizing position. By inverting the relative mobility of the different parts the soft iron parts of the magnetic circuit can be made displaceable in one direction towards a stationary permanent magnet bar under simultaneous reduction of the tape containing gap and in the opposite direction for opening the magnet circuit as well at the magnet bar as at the tape containing gap. Thus, e.g. the connecting parts 17 shown in FIG. 7 or 22 according to FIG. 8 can be placed on the same side of the periphery of the wheel 3 as the tape 5 and the counter pole 19. In this case the movable parts 17, 19, 22 previously described with reference to these figures can be made fixed and both gaps can be closed for registration by displacing the wheels 3 relative to the magnetic cycle 1, 2, 17, and 19 or 1, 22, and 19 respectively, or vice versa.

What I claim is:

1. An apparatus for registering code markings on a magnetizable support comprising an open soft magnetic circuit with two openings, a permanent magnet movable between a rest position remote from one first of said openings in the soft magnetic circuit and a position closing said first opening, the second of said two openings in the soft magnetic circuit being defined on one side by a counter pole and on the other side by at least one soft magnetic support, poles on said soft magnetic support having pole surfaces shaped to correspond to different code marks, said support being adjustable with a selected pole surface facing said counter pole and forming a part of the soft magnetic circuit, means for adjusting the magnetizable support between the selected pole surface and the counter pole, and means for moving said permanent magnet for a short period of time to close said first opening and then back to said rest position.

2. An apparatus for registering code markings on a magnetizable support comprising an open soft magnetic circuit with two openings, a permanent magnet movable between a magnetizing position closing one first of said openings and a rest position remote from said first opening and resting with its poles against the free ends of a yoke shaped member short circuiting the field of the permanent magnet, the second of said openings being defined on one side by a counter pole and on the other side by a support of soft magnetic material with pole surfaces shaped to correspond to different code marks, said pole support being adjustable with a selected pole surface facing said counter pole, means for adjusting a magnetizable tape between the selected pole surface and the counter pole and means for moving said permanent magnet for a short period of time to said magnetizing position.

3. An apparatus as claimed in claim 2 in which the pole support consists of a longitudinally displaceable bar having one smooth side slidably engaging one side of the second opening in the soft magnetic circuit, another side of said bar having poles with pole surfaces corresponding to the code marks and facing the counter pole and said magnetizable tape adjustable between the counter pole and the pole surface facing the latter.

4. An apparatus for registering code markings on a magnetizable support comprising an open soft magnetic circuit with two openings, a permanent magnet movable between a magnetizable position closing one first of said openings and a rest position remote from said first opening, the second of said openings being defined on one side by a counter pole and on the other side by at least one rotatable wheel of soft magnetic material with pole surfaces on its periphery shaped to correspond to different code marks, said pole wheel or wheels being adjustable by rotation to bring a selected pole surface of each wheel in a position facing said counter pole, means for adjusting a magnetizable tape between the selected pole surface and the counter pole and means for moving the permanent magnet for a short period of time to said magnetizing position to pass a magnetic flux through the soft magnetic circuit and the magnetizable tape to magnetize thereon a code marking corresponding to the code marking represented by the selected pole surface.

5. An apparatus for registering code markings on a magnetizable support comprising an open soft magnetic circuit with two openings, a longitudinally magnetized permanent magnet bar movable between a magnetizing position with each end pole of the magnet bar engaging an end surface of a soft magnetic circuit part limiting one first of said openings and a rest position remote from said first opening with each end pole of the magnet bar engaging one of the ends of a soft magnetic short circuiting yoke, the second of said openings being defined on one side by a counter pole surface and on the other side by a support of soft magnetic material with pole surfaces shaped to correspond to different code marks, said pole support being adjustable with a selected pole surface facing said counter pole, means for adjusting a magnetizable tape between the selected pole surface and the counter pole and means for moving said permanent magnet for a short period of time to said magnetizing position.

6. An apparatus as claimed in claim 5, in which the permanent magnet bar is movable transversely of its length and has opposed plane side surfaces engaging end surfaces parallel with the magnet bar on the ends of the soft magnetic circuit portions adjacent said first opening and on the ends of the short circuiting yoke.

7. An apparatus as claimed in claim 5, in which the permanent magnet bar has opposed end surfaces forming portions of a cylindrical surface and facing corresponding surfaces on opposite sides of the opening of the short circuiting yoke in the rest position, and of said first opening in the magnetizing position.

8. An apparatus for registering code markings on a magnetizable support comprising an open soft magnetic circuit with two openings, a permanent magnet movable between a magnetizing position closing one first of said openings and a rest position remote from said first opening, the second of said openings being defined on one side by a counter pole and on the other side by at least one rotatable wheel of soft magnetic material having grooves in its periphery and pole pieces inserted in said grooves with at least two pole pieces in each groove, said pole pieces having outer pole surfaces with linear projections parallel with the groove and forming each a part of pole markings made of diffierent combination of lines, at least one pole piece in each groove being provided for magnetizing reference marks for the reading of the code markings magnetized by the other pole piece or pieces in the same groove, said wheel or wheels being adjustable by rotation to bring a selected pole surface of each wheel in a position facing said counter pole, means for adjusting a magnetizable tape between the selected pole surface and the counter pole and means for moving the permanent magnet for a short period of time to said magnetizing position to pass a magnetic flux through the soft magnetic circuit and the magnetizable tape to magnetize thereon a code marking corresponding to the code marking represented by the selected pole surface.

9. An apparatus as claimed in claim 8, in which the grooves for the pole pieces in the soft magnetic wheel or wheels are parallel with the axis of rotation of the wheel or wheels, said axis being mounted in the transverse direction of the longitudinal adjusting motion of the magnetizable tape.

10. An apparatus for registering code markings on a magnetizable support comprising an open soft magnetic circuit with two openings, a permanent magnet movable between a magnetizing position closing on first of said openings and a rest position remote from said first opening, the second of said openings being defined on one side by a counter pole and on the other side by at least one rotatable wheel containing discs of soft magnetic material interfoiled with layers of non-magnetic material, recesses cut into the edges of said soft magnetic discs corresponding to voids in the linear pattern of the code markings, each wheel being adjustable by rotation to bring a selected portion of its periphery forming a selected pole surface corresponding to the code marks to be registered in a position facing said counter pole, means for adjusting a magnetizable tape between the selected pole surface and the counter pole, means for moving the permanent magnet for a short period of time to said magnetizing position to pass a magnetic flux through the soft magnetic circuit and the magnetizable tape to magnetize thereon a code marking corresponding to the code marking represented by the selected pole surface.

11. An apparatus as claimed in claim 10, in which each wheel has its periphery magnetically joined to its side of the second opening in the soft magnetic circuit by connecting pieces movable into and out of contact with said periphery.

12. An apparatus for registering code markings on a magnetizable support comprising an open soft magnetic circuit with two openings, a permanent magnet movable between a rest position remote from one first of said openings in the soft magnetic circuit and a position closing said first opening, the second of said two openings in the soft magnetic circuit being defined on one side by a counter pole and on the other side by at least one soft magnetic support, poles on said soft magnetic support having pole surfaces shaped to correspond to different code marks, said support being adjustable with a selected pole surface facing said counter pole and forming part of the soft magnetic circuit, a pad of nonmagnetic material between said counter pole and the magnetizable support, means for adjusting the magnetizable support between the selected pole surface and the counter pole, means for moving the counter pole and the pole support towards each other to press the magnetizable support against the selected pole surface by means of the pad and means for moving said permanent magnet for a short period of time to close said first opening and then back to said rest position.

References Cited

UNITED STATES PATENTS

| | | | |
|---|---|---|---|
| 3,296,606 | 1/1967 | De Neergaard | 346—74 |
| 3,218,398 | 11/1965 | Wiley | 179—100.2 |
| 2,771,505 | 11/1956 | Avery et al. | 346—74 |

BERNARD KONICK, *Primary Examiner.*

T. W. FEARS, *Examiner.*

A. I. NEUSTADT, *Assistant Examiner.*